United States Patent
Kusuyama

(10) Patent No.: US 6,852,778 B1
(45) Date of Patent: Feb. 8, 2005

(54) ANAEROBICALLY CURABLE COMPOSITION

(75) Inventor: Aki Kusuyama, Tokyo (JP)

(73) Assignee: Three Bond Co., Ltd., Tokyo (JP)

( * ) Notice: Subject to any disclaimer, the term of this patent is extended or adjusted under 35 U.S.C. 154(b) by 222 days.

(21) Appl. No.: 09/980,632

(22) PCT Filed: Jun. 9, 2000

(86) PCT No.: PCT/JP00/03750

§ 371 (c)(1),
(2), (4) Date: Dec. 5, 2001

(87) PCT Pub. No.: WO00/77110

PCT Pub. Date: Dec. 21, 2000

(30) Foreign Application Priority Data

Jun. 11, 1999 (JP) .......................................... 11-164636

(51) Int. Cl.$^7$ ............................. C09J 4/00; C08F 20/70; C08F 120/70
(52) U.S. Cl. ...................... 523/176; 526/109; 526/111; 526/213; 526/216; 526/320; 526/321
(58) Field of Search .......................... 523/176; 526/109, 526/111, 213, 216, 320–321

(56) References Cited

U.S. PATENT DOCUMENTS

| 3,933,748 A | * | 1/1976 | Matsuda et al. ............ 526/240 |
| 4,215,209 A | | 7/1980 | Ray-Chaudhuri et al. |
| 4,235,986 A | * | 11/1980 | Catena ....................... 526/320 |
| 4,262,106 A | * | 4/1981 | Frauenglass et al. ........ 526/257 |
| 4,386,194 A | | 5/1983 | Gruber ........................ 526/301 |
| 4,433,124 A | * | 2/1984 | Okamoto et al. ........... 526/277 |
| 4,546,125 A | * | 10/1985 | Okamoto et al. ........... 523/176 |
| 4,645,810 A | | 2/1987 | Fischer ....................... 526/204 |
| 4,755,571 A | | 7/1988 | Irving et al. ................ 525/532 |
| 5,126,416 A | | 6/1992 | Yang ............................ 526/89 |
| 5,411,998 A | | 5/1995 | McArdle et al. |
| 5,506,326 A | | 4/1996 | Kneafsey .................... 526/320 |
| 6,096,842 A | | 8/2000 | Friese et al. ................ 526/109 |

FOREIGN PATENT DOCUMENTS

| JP | 60-32868 A | 2/1985 |
| JP | 62-184076 | 8/1987 |
| JP | 4-261484 A | 9/1992 |
| JP | 5-105847 A | 4/1993 |

OTHER PUBLICATIONS

International Search Report.

* cited by examiner

Primary Examiner—P. Hampton Hightower
(74) Attorney, Agent, or Firm—Sughrue Mion, PLLC

(57) ABSTRACT

Anaerobically curable compositions comprising: (a) a polymerizable monomer having a functional group represented by the general formula: $H_2C=C(R)-$ (wherein R is a hydrogen atom or a methyl group) at a terminal of its molecule; (b) an organic peroxide; (c) o-benzoic sulfimide; and (d) a salt selected from the group consisting of sodium salts, potassium salts and calcium salts of weakly acidic substances, have a high curing rate and high bonding strength despite of having high storage stability. In particular, the composition can rapidly bond even adherends such as inactive metals and plastics, with which conventional anaerobically curable compositions are hardly cured.

3 Claims, No Drawings

ANAEROBICALLY CURABLE COMPOSITION

TECHNICAL FIELD

The present invention relates to an anaerobic composition which has the property of stably retaining a liquid state over long, without gelling, when in contact with air or oxygen and rapidly curing upon isolation from the air or oxygen.

BACKGROUND ART

Anaerobic compositions contain a (meth)acrylic ester monomer as the main component and have the property of stably retaining a liquid state over long, without gelling, when in contact with air or oxygen and rapidly curing upon isolation from or exclusion of the air or oxygen. Owing to this property, these compositions are used for the bonding or fixing of screws, bolts, etc., securing of mating parts, bonding of flanges to each other, sealing, filling of void spaces formed in cast parts, and other applications.

Recently, there is a desire for the development of an anaerobic composition having an extremely high polymerization rate so as to cope with speedups in production lines for producing industrial products. A conventional technique for increasing the polymerization rate of an anaerobically curable composition is to incorporate a polymerization accelerator, e.g., a sulfimide, mercaptan, or amine, and a polymerization initiator into resin ingredients.

However, use of such conventional polymerization accelerators impairs the storage stability of the anaerobically curable composition, and it is extremely difficult to regulate the addition amount of a polymerization initiator so as not to reduce the storage stability. No anaerobically curable composition has been obtained so far which is sufficiently applicable to production lines, etc.

An anaerobically curable composition basically contains two coexistent ingredients, i.e., an ingredient serving to polymerize a radical-polymerizable monomer and an ingredient serving to inhibit the polymerization of the radical-polymerizable monomer, and can be made to perform its function by suitably balancing the two ingredients with each other. Virtually, however, various factors should be supposed in determining the degree of storage stability, because there may be cases where the composition, when sold as a product, is exposed to a high temperature in a vehicle during transportation or directly irradiated with sunlight during storage. Namely, sufficient storage stability should be imparted even at the sacrifice of curability and it has been impossible to enhance polymerization curability to an extremely high degree.

Furthermore, the conventional anaerobically curable compositions cannot show a sufficient curing performance only with the condition that they are isolated from air or oxygen. Namely, in order for the conventional anaerobically curable compositions to exhibit a sufficient bonding strength, they should be applied to metallic adherends. This is because metal atoms, metal molecules, metal ions, or the like contained in the adherends function as a polymerization catalyst. There has hence been a problem that when the conventional anaerobically curable compositions are applied to plastics or inert metals such as deposit surfaces of plated articles, the compositions suffer a curing failure or cure to only have an insufficient bonding strength.

The present invention is to solve the above-described problems in the conventional techniques. Accordingly, an object of the invention is to provide an anaerobically curable composition which has improved adhesion properties without impairing storage stability.

Another object of the invention is to provide an anaerobically curable composition which is useful for application to inert metals and plastics, which have been difficult to bond with any conventional anaerobically curable composition.

DISCLOSURE OF THE INVENTION

The above-described objects of the invention have been achieved by the following anaerobically curable compositions.

(1) An anaerobically curable composition comprising:
  (a) a polymerizable monomer having a functional group represented by the general formula: $H_2C=C(R)-$ (wherein R is a hydrogen atom or a methyl group) at a terminal of its molecule;
  (b) an organic peroxide;
  (c) o-benzoic sulfimide; and
  (d) a salt selected from the group consisting of sodium salts, potassium salts and calcium salts of weakly acidic substances.

(2) The anaerobically curable composition of the above item (1), wherein ingredient (a) comprises a hydroxyl-containing (meth)acrylate.

(3) The anaerobically curable composition of the above item (2), which is obtained by mixing ingredient (d) with the hydroxyl-containing (meth)acrylate to obtain compatibility and then mixing the resultant with the other ingredients.

(4) The anaerobically curable composition of the above item (1), wherein the weakly acidic substance is selected from the group consisting of carbonic acid, boric acid, phosphoric acid, nitrous acid, hypochlorous acid, formic acid, acetic acid, propionic acid, caproic acid, lauric acid, myristic acid, palmitic acid, oleic acid, stearic acid, citric acid, gluconic acid, succinic acid, tartaric acid, lactic acid, fumaric acid, malic acid, butyric acid and o-benzoic sulfimide.

BEST MODES FOR CARRYING OUT THE INVENTION

Examples of the polymerizable monomer (a) having a functional group represented by $H_2C=C(R)-$ (wherein R is a hydrogen atom or a methyl group) for use in the invention include compounds having a vinyl group such as acrylic acid and methacrylic acid at a terminal of its molecule, and derivatives thereof. Specific examples of the polymerizable monomer include monoesters such as methyl (meth)acrylate, ethyl (meth)acrylate, butyl (meth)acrylate, 2-ethylhexyl (meth)acrylate, phenyl (meth)acrylate and benzyl (meth)acrylate; hydroxyalkyl esters such as 2-hydroxyethyl (meth)acrylate and 2-hydroxypropyl (meth)acrylate; esters with polyhydric alcohols, such as ethylene glycol diacrylate, polyethylene glycol di(meth)acrylate, neopentyl glycol di(meth)acrylate, trimethylolpropane tri(meth)acrylate and pentaerythritol tetraacrylate; (meth)acrylonitrile, (meth)acrylamide and N-substituted (meth)acrylamides; vinyl esters such as vinyl acrylate, vinyl acetate, vinyl propionate and vinyl succinate; vinyl compounds such as vinyl ethers, styrene, halogenated styrenes, divinylbenzene, vinylnaphthalene, N-vinylpyrrolidone, diallyl phthalate, diallyl maleate, triallyl isocyanate and triallyl phosphate. These polymerizable monomers can be used alone or as a mixture of two or more thereof.

The polymerizable monomer may contain a polymerizable oligomer for the purpose of adjusting the viscosity of the anaerobically curable composition or controlling the properties of the cured composition to be obtained therefrom. Examples of the polymerizable oligomer include curable resins having a maleate, fumarate, allyl or (meth)acrylate group, isocyanate-modified acrylic oligomers, epoxy-modified acrylic oligomers, polyester acrylic oligomers and polyether acrylic oligomers. These oligomers can be used alone or as a mixture of two or more thereof.

The polymerizable monomer may further contain a polymerizable unsaturated polymer such as, e.g., an unsaturated polyester resin or unsaturated acrylic resin for the same purpose as for the above polymerizable oligomer.

The organic peroxide (b) for use in the invention is not particularly limited and may be one which has conventionally been used in anaerobically curable compositions. Examples thereof include organic peroxides including hydroperoxides, ketone peroxides, diaryl peroxides, and peroxyesters, such as cumene hydroperoxide, t-butyl hydroperoxide, p-menthane hydroperoxide, methyl ethyl ketone peroxide, cyclohexane peroxide, dicumyl peroxide and diisopropylbenzene hydroperoxide.

These organic peroxides can be used alone or as a mixture of two or more thereof. The incorporation amount of ingredient (b) is from 0.1 to 5 parts by weight per 100 parts by weight of the sum of the polymerizable monomer and the polymerizable oligomer. In case where the incorporation amount of ingredient (b) is smaller than 0.1 part by weight, there is a fear that the polymerization reaction may not proceed sufficiently. Incorporation amounts thereof larger than 5 parts by weight tend to result in reduced stability of the anaerobically curable composition.

Ingredient (c) for use in the invention is o-benzoic sulfimide, which is an ingredient commonly used in anaerobically curable compositions. o-Benzoic sulfimide is so-called saccharin. The addition amount of ingredient (c) is from 0.5 to 5 parts by weight per 100 parts by weight of ingredient (a).

In ingredient (d) for use in the invention, the weakly acidic substance is a substance having an ionization constant Ka of from $1 \times 10^{-3}$ to $1 \times 10^{-11}$. Examples thereof include carbonic acid, boric acid, phosphoric acid, nitrous acid, hypochlorous acid, formic acid, acetic acid, propionic acid, caproic acid, lauric acid, myristic acid, palmitic acid, oleic acid, stearic acid, citric acid, gluconic acid, succinic acid, tartaric acid, lactic acid, fumaric acid, malic acid, butyric acid and o-benzoic sulfimide.

Although ingredient (d) is a known substance, it has never been added to an anaerobically curable composition. In particular, it has been quite unexpected that use of a mixture of o-benzoic sulfimide and ingredient (d) improves the polymerizability of an anaerobically curable composition. Ingredient (d) is a water-soluble substance hardly compatible with ingredient (a). It is therefore preferred that ingredient (d) be mixed with and sufficiently dissolved in a hydroxyl-containing monomer, especially a hydroxyl-containing (meth)acrylate, before being mixed with ingredient (a).

The incorporation amount of ingredient (d) according to the invention is desirably from 0.005 to 1 part by weight per 100 parts by weight of ingredient (a). In case where the incorporation amount of ingredient (d) is smaller than 0.005 parts by weight, there is a fear that no polymerization-accelerating effect may be obtained. In case where the incorporation amount thereof is larger than 1 part by weight, there is a fear that part of the ingredient (d) may remain undissolved in the composition to give solid substances suspended in the composition.

Besides the ingredients described above, an ingredient which accelerates polymerization can be added to the composition in a small amount. Examples of the polymerization accelerator include amine compounds and mercaptan compounds. Examples of the amine compounds include heterocyclic secondary amines such as 1,2,3,4-tetrahydroquinoline and 1,2,3,4-tetrahydroquinaldine, heterocyclic tertiary amines such as quinoline, methylquinoline, quinaldine, and quinoxalophenazine, aromatic tertiary amines such as N,N-dimethylanisidine and N,N-dimethylaniline, and azole compounds such as 1,2,4-triazole, oxazole, oxadiazoles, thiadiazoles, benzotriazole, hydroxybenzotriazole, benzothiazole, benzoxazole, 1,2,3-benzothiadiazole, and 3-mercaptobenzotriazole. Examples of the mercaptan compounds include linear mercaptans such as n-dodecyl mercaptan; ethyl mercaptan, and butyl mercaptan.

These polymerization accelerators may be incorporated in an amount of from 0 to 1 part by weight, preferably from 0.1 to 0.5 parts by weight, per 100 pars by weight of either the polymerizable monomer or the mixture of the polymerizable monomer and the polymerizable oligomer and/or polymerizable unsaturated polymer. Even when a polymerization accelerator is incorporated in an amount smaller than 0.1 part by weight, no polymerization-accelerating effect is produced. Incorporation amounts thereof exceeding 0.5 parts by weight result in impaired storage stability of the anaerobically curable composition.

Various additives can be used in the invention. For example, in order to obtain storage stability, additives can be added such as radical scavengers, e.g., benzoquinone, hydroquinone and hydroquinone monomethyl ether, and metal-chelating agents, e.g., ethylenediaminetetraacetic acid or a disodium salt thereof, oxalic acid, acetylacetone and o-aminophenol.

Furthermore, other ingredients such as, e.g., a thickener, filler, plasticizer and colorant can be used according to need in order to control the properties of the anaerobically curable composition and of the cured composition to be formed therefrom.

The anaerobically curable composition of the invention can be obtained by mixing the ingredients together by stirring. It is, however, preferred that ingredient (b) only be added finally because there is a fear that it may decompose upon stirring. The stirring may be conducted for a period sufficient to homogenize the ingredients.

Specifically, the procedure may be as follows. Ingredients (a), (c) and (d) and other additives are weighed out, introduced into a vessel, and stirred with a stirrer. Although the stirring may be conducted at ordinary temperature, it is preferred to heat the ingredients to about 50° C. The stirring time is about 10 hours in the case of heating to 50° C. Thereafter, the mixture is cooled to ordinary temperature, and ingredient (b) is weighed out and added thereto. This mixture is further stirred for about 1 hour. Although the stirring does not necessitate pressurizing, evacuation or sealing, it is preferred to seal the vessel during heating.

In the case where ingredient (a) contains a hydroxyl-containing (meth)acrylate, it is preferred to conduct a separate step in which the hydroxyl-containing (meth)acrylate as part of the ingredient (a) is mixed beforehand with ingredient (d) with stirring. Namely, an ingredient (d) mixture is prepared beforehand by adding the ingredient (d) to the hydroxyl-containing (meth)acrylate and stirring these ingredients together at about 50° C. for about 5 hours, and this mixture is added as ingredient (d).

According to the invention, the curing rate of an anaerobically curable composition can be improved by adding o-benzoic sulfimide, which is generally used, in combination with the sodium, potassium or calcium salt of a weakly acidic substance. It is surprising that the composition, even when applied to an adherend made of a material other than active metals, can be cured rapidly and can attain tenacious bonding. Furthermore, the composition can be stored at room temperature because the storage stability thereof is not impaired despite the improvement in curing rate.

The invention will be explained below in more detail by reference to the following Examples. In the Examples, all "parts" are by weight and all the values of incorporation amount in the tables are given in terms of "parts by weight".

EXAMPLES 1 TO 7 AND COMPARATIVE EXAMPLES 1 TO 5

The compounds shown in Tables 1 and 2 were mixed to obtain compositions. As the urethane acrylate was used GNM-U, manufactured by Kyoeisha Chemical Co., Ltd. The "solution of OSBI sodium salt" given in Table 1 is a solution obtained by mixing 1 g of the sodium salt of o-benzoic sulfimide with 99 g of hydroxyethyl methacrylate and sufficiently stirring the mixture. Namely, the addition of 1 part by weight of this solution corresponds to the addition of 0.01 part by weight of the sodium salt of o-benzoic sulfimide. The "OSBI-STQ salt" is the 1,2,3,4-tetrahydroquinoline salt of o-benzoic sulfimide.

(Storage Stability Test)

In a 100-ml test tube made of low-density polyethylene was placed 50 g of each composition obtained above. The composition in the test tube was stored in a 50° C. atmosphere for 10 days without covering the test tube with a lid. The compositions which gelled within the test tube are indicated by "X" and those which neither gelled nor thickened are indicated by O.

(Curability (Curing Rate) Test)

Two test pieces (100 mm×25 mm) made of each of the materials shown in Table 2 were crosswise bonded to each other with each of the compositions obtained above. A load of 10 g was placed on each crossed test pieces to fix them. The time required for the crossed test pieces to become unmovable by hand (setting time) was measured at a temperature of 25° C. In Table 2, the unit of setting time is minute. The compositions which did not set in 360 minutes are indicated by "-".

The results obtained are shown in Tables 1 and 2.

TABLE 1

| Composition | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| Urethane oligomer | 60 | 60 | 60 | 60 | 60 | 60 | 60 | 60 | 60 | 60 | 60 | 60 |
| Isobornyl acrylate | 40 | 40 | 40 | 40 | 40 | | | 40 | 40 | 40 | | |
| 2-Hydroxyethyl methacrylate | | | | | | 40 | 40 | | | | 40 | 40 |
| Cumene hydroperoxide | 1 | 1 | 1 | 1 | 1 | 1 | 1 | 1 | 1 | 1 | 1 | 1 |
| o-Benzoic sulfimide | 1.5 | 1.5 | 1.5 | 1.5 | 1.5 | 1.5 | 1.5 | 1.5 | 1.5 | | | 1.5 |
| Solution of OSBI sodium salt | 1 | 2 | 3 | 4 | 5 | 2 | 3 | | | | | |
| Benzothiazole | 0.2 | 0.1 | | | | 0.1 | 0.1 | 0.2 | 0.2 | | | |
| n-Dodecyl mercaptan | 0.2 | 0.2 | | | | | | 0.2 | 0.4 | | 0.2 | 0.2 |
| OSBI · STQ salt | | | | | | | | | | 1.5 | 1.5 | |

TABLE 2

| Evaluation | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| Storage stability | O | O | O | O | O | O | O | O | O | O | O | O |
| Curing rate (min) | | | | | | | | | | | | |
| Iron | 1.5 | 1.5 | 2 | 2 | 2 | 1.5 | 1 | 4 | 3.5 | 15 | 10 | 15 |
| Aluminum | 3 | 3 | 3.5 | 3 | 3 | 2.5 | 2.5 | 10 | 12 | 45 | 35 | 40 |
| Stainless steel | 2.5 | 3 | 3 | 2.5 | 2.5 | 2.5 | 2 | 9 | 10.5 | 40 | 30 | 40 |
| Zinc chromate deposit | 25 | 20 | 30 | 30 | 35 | 25 | 20 | 140 | 125 | — | — | — |
| PPS | 40 | 40 | 50 | 60 | 55 | 50 | 55 | — | — | — | — | — |
| Polystyrene | 45 | 40 | 60 | 65 | 60 | 55 | 50 | — | — | — | — | — |
| Nylon-6,6 | 35 | 35 | 50 | 55 | 60 | 50 | 40 | — | — | — | — | — |

EXAMPLES 8 TO 25 AND COMPARATIVE EXAMPLES 6 TO 18

To 600 parts of BPE100 (manufactured by Shin-Nakamura Chemical Co., Ltd.), which is an epoxy acrylate having a bisphenol A framework, was added 400 parts of 2-hydroxyethyl methacrylate. Thereto were added 10 parts of cumene hydroperoxide and 15 parts of o-benzoic sulfimide. The ingredients were sufficiently mixed together to give a base resin. To this base resin was added each of the salts shown in Tables 3 to 5. However, each salt was added as a solution thereof prepared by adding 1 part by weight of the salt to 99 parts of 2-hydroxyethyl methacrylate other than that described above and sufficiently stirring the mixture; this solution was added in the amount shown in Tables 3 to 5. Namely, the actual addition amount of each salt is one-hundredth the amount shown in Tables 3 to 5.

The compositions obtained above were subjected to a bonding strength measurement and a bonding rate measurement and to the same storage stability test as conducted in Example 1.

Bonding Strength Measurement

A hexagon head bolt of the JIS second grade (M: 10, P: 1.5×20 mm) and a hexagon nut (M: 10, P=1.5) were used. The surface of the bolt had been plated with zinc chromate. Each of the compositions described above was evenly applied to the bolt on the whole periphery of its external thread part extending from the front end to about 10 mm therefrom in such an amount that the composition did not drip. This bolt was then inserted into the nut. At the time when the bolt had been screwed into the nut by two threads, the nut side was held above and two drops of the composition were applied to the internal thread of the nut. Immediately thereafter, the bolt was further screwed to such a degree that a front end part of the bolt was exposed by about three threads. The bolt was not screwed completely.

The bolt and nut were allowed to stand in that state at 25° C. for 2 hours to cure the composition. The head of the secured bolt was fixed with a vice and the nut was rotated with a torque wrench to measure the torque required for the nut to begin to rotate.

Bonding Rate Test

The same bolt and nut as those described above were used. Each composition was applied thereto in the same manner as the above to secure the bolt to the nut. In this manner, many bolt/nut samples were prepared. After the bonding operation, these samples were allowed to stand at 25° C. for respective given time periods and then examined for the torque required for the bolt to be rotated with a torque wrench. This test was repeatedly conducted until that torque reached 0.5 N·m. The given time periods ranged at an interval of 10 minutes. The time period required for that torque to reach that value was taken as the setting time. The compositions which did not set in 360 minutes are indicated by "-".

The results obtained are shown in Tables 3 to 5.

TABLE 3

| Composition | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Base resin | 100 | 100 | 100 | 100 | 100 | 100 | 100 | 100 | 100 | 100 |
| Sodium acetate | 10 | | | | | | | | | |
| Sodium OSBI | | 10 | | | | | | | | |
| Sodium carbonate | | | 10 | | | | | | | |
| Sodium butyrate | | | | 10 | | | | | | |
| Potassium hydrogen oxalate | | | | | 10 | | | | | |
| Potassium hydrogen phthalate | | | | | | 10 | | | | |
| Potassium carbonate | | | | | | | 10 | | | |
| Calcium carbonate | | | | | | | | 10 | | |
| Calcium acetate | | | | | | | | | 10 | |
| Calcium benzoate | | | | | | | | | | 10 |
| Bonding strength (N · m) | 7.0 | 5.5 | 6.5 | 6.5 | 5.5 | 6.0 | 7.0 | 6.5 | 6.5 | 7.0 |
| Bonding rate (min) | 40 | 60 | 60 | 80 | 80 | 70 | 60 | 50 | 60 | 50 |
| Storage stability | ○ | ○ | ○ | ○ | ○ | ○ | ○ | ○ | ○ | ○ |

TABLE 4

| Composition | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|---|---|
| Base resin | 100 | 100 | 100 | 100 | 100 | 100 | 100 | 100 | 100 | 100 | 100 |
| Sodium chloride | | 10 | | | | | | | | | |
| Sodium sulfate | | | 10 | | | | | | | | |
| Potassium chloride | | | | 10 | | | | | | | |
| Potassium nitrate | | | | | 10 | | | | | | |
| Potassium sulfate | | | | | | 10 | | | | | |
| Barium chloride | | | | | | | 10 | | | | |
| Barium formate | | | | | | | | 10 | | | |
| Magnesium sulfate | | | | | | | | | 10 | | |
| Magnesium carbonate | | | | | | | | | | 10 | |
| n-Dodecyl mercaptan | | | | | | | | | | | 10 |
| Bonding strength (N · m) | 3.0 | 2.5 | 3.5 | 3.5 | 3.0 | 2.5 | 3.0 | 2.5 | 2.5 | 3.0 | 4.5 |
| Bonding rate (min) | 120 | 120 | 100 | 100 | 100 | 100 | 130 | 120 | 120 | 130 | 30 |
| Storage stability | ○ | ○ | ○ | ○ | ○ | ○ | ○ | ○ | ○ | ○ | X |

TABLE 5

| Composition | Ex. 18 | Ex. 19 | Ex. 20 | Ex. 21 | Comp. Ex. 17 | Ex. 22 | Ex. 23 | Ex. 24 | Ex. 25 | Comp. Ex. 18 |
|---|---|---|---|---|---|---|---|---|---|---|
| Base resin | 100 | 100 | 100 | 100 | 100 | 100 | 100 | 100 | 100 | 100 |
| Sodium acetate | 50 | 20 | 1 | 0.5 | 0.3 | | | | | |
| Sodium OSBI | | | | | | 50 | 20 | 1 | 0.5 | 0.3 |
| Bonding strength (N · m) | 6.0 | 6.5 | 7.0 | 5.0 | 3.5 | 3.5 | 5.0 | 5.5 | 5.5 | 3.0 |
| Bonding rate (min) | 60 | 40 | 40 | 70 | 150 | 80 | 60 | 60 | 70 | 110 |
| Storage stability | ○ | ○ | ○ | ○ | ○ | ○ | ○ | ○ | ○ | ○ |

EXAMPLES 26 TO 28 AND COMPARATIVE EXAMPLES 19 TO 23

According to the formulations given in Table 6, compositions were produced in the same manner as in Example 8. Each of the compositions thus prepared was applied to an end part of each of two test pieces made of a polycarbonate having dimensions of 100 mm×25 mm, and the test pieces were bonded to each other so that they overlapped each other over a width of 20 mm. A load of 100 g was placed on the bonding area to fix the test pieces at 25° C. for 2 hours. The ends of the bonded test pieces were pulled with a tensile shear tester to measure the bonding strength (tensile shear strength). This tensile shear bonding strength test was conducted in accordance with JIS K 6850 (1994), expect that the bonding width in the test piece length direction was changed from 12.5±0.5 mm to 20 mm. The results obtained are shown in Table 6.

TABLE 6

| Composition | Ex. 26 | Ex. 27 | Ex. 28 | Comp. Ex. 19 | Comp. Ex. 20 | Comp. Ex. 21 | Comp. Ex. 22 | Comp. Ex. 23 |
|---|---|---|---|---|---|---|---|---|
| Base resin | 100 | 100 | 100 | 100 | 100 | 100 | 100 | 100 |
| Sodium acetate | 1 | | | | | | | |
| Potassium carbonate | | 1 | | | | | | |
| Calcium acetate | | | 1 | | | | | |
| Sodium chloride | | | | 1 | | | | |
| Potassium nitrate | | | | | 1 | | | |
| Barium chloride | | | | | | 1 | | |
| Magnesium carbonate | | | | | | | | 1 |
| Tensile shear (Pa) | 0.45 | 0.50 | 0.45 | 0 | 0 | 0 | 0 | 0 |

EXAMPLES 29 TO 34

Sodium acetate powder or potassium acetate was directly added in each of the amounts shown in Table 7 to the base resin used in Example 8, and the mixture was sufficiently stirred. Thus, compositions were produced. These compositions were subjected to the same tests as in Example 8. The results obtained are shown in Table 7.

TABLE 7

| Composition | Ex. 29 | Ex. 30 | Ex. 31 | Ex. 32 | Ex. 33 | Ex. 34 |
|---|---|---|---|---|---|---|
| Base resin | 100 | 100 | 100 | 100 | 100 | 100 |
| Sodium acetate | 0.5 | 0.1 | 0.05 | | | |
| Calcium acetate | | | | 0.5 | 0.1 | 0.05 |
| Bonding strength (N · m) | 6.0 | 6.5 | 7.0 | 6.5 | 6.5 | 6.5 |
| Bonding rate (min) | 70 | 50 | 50 | 70 | 70 | 70 |
| Storage stability | ○ | ○ | ○ | ○ | ○ | ○ |

INDUSTRIAL APPLICABILITY

The anaerobically curable composition of the invention has a high curing rate and high bonding strength despite of having high storage stability. In particular, the composition can be used for bonding adherends such as inactive metals, e.g., passivated metals, zinc chromate deposits and unichromate deposits, and plastics, although it has been difficult to bond such adherends with any conventional anaerobically curable composition.

What is claimed is:

1. An anaerobically curable composition comprising:
   (a) a polymerizable monomer having a functional group represented by the general formula: $H_2C=C(R)-$ (wherein R is a hydrogen atom or a methyl group) at a terminal of its molecule;
   (b) an organic peroxide;
   (c) o-benzoic sulfimide; and
   (d) a salt selected from the group consisting of sodium salts, potassium salts and calcium salts of o-benzoic sulfimide, wherein an amount of ingredient (d) is 0.005 to 0.5 part by weight per 100 Parts of ingredient (a).

2. The anaerobically curable composition of claim 1, wherein ingredient (a) comprises a hydroxyl-containing (meth)acrylate.

3. The anaerobically curable composition of claim 2, which is obtained by mixing ingredient (d) with the hydroxyl-containing (meth)acrylate to obtain compatibility and then mixing the resultant with the other ingredients.

* * * * *